United States Patent
Nojima

(10) Patent No.: US 8,916,007 B2
(45) Date of Patent: *Dec. 23, 2014

(54) COMPOSITION FOR CHEMICAL CONVERSION TREATMENT AND MEMBER HAVING A CHEMICAL CONVERSION COATING FORMED BY THE TREATMENT

(75) Inventor: Naruhiko Nojima, Kariya (JP)

(73) Assignee: Yuken Industry Co., Ltd., Kariya (JP)

(*) Notice: Subject to any disclaimer, the term of this patent is extended or adjusted under 35 U.S.C. 154(b) by 904 days.

This patent is subject to a terminal disclaimer.

(21) Appl. No.: 12/676,050

(22) PCT Filed: Sep. 3, 2008

(86) PCT No.: PCT/JP2008/065840
§ 371 (c)(1),
(2), (4) Date: May 3, 2010

(87) PCT Pub. No.: WO2009/031568
PCT Pub. Date: Mar. 12, 2009

(65) Prior Publication Data
US 2010/0212542 A1 Aug. 26, 2010

(30) Foreign Application Priority Data
Sep. 3, 2007 (JP) .................................. 2007-227769

(51) Int. Cl.
*C23C 22/30* (2006.01)
(52) U.S. Cl.
USPC ......................................... 148/267; 106/14.05
(58) Field of Classification Search
CPC .............................. C23C 2222/10; C23C 22/30
USPC .......................................................... 148/267
See application file for complete search history.

(56) References Cited

U.S. PATENT DOCUMENTS

| | | | | |
|---|---|---|---|---|
| 3,935,035 A | * | 1/1976 | Tanaka et al. ................. | 148/267 |
| 6,447,620 B1 | | 9/2002 | Komiyama et al. | |
| 2004/0173289 A1 | * | 9/2004 | Kinoshita et al. ............. | 148/248 |

FOREIGN PATENT DOCUMENTS

| | | | | |
|---|---|---|---|---|
| JP | 55-031114 | * | 3/1980 | ............. C23C 22/50 |
| JP | 02085372 A | | 3/1990 | |
| JP | 07011455 A | | 1/1995 | |
| JP | 11077028 A | | 3/1999 | |
| JP | 2000053910 A | | 2/2000 | |
| JP | 2002226981 A | | 8/2002 | |
| JP | 2005240084 A | | 9/2005 | |
| JP | 2006028547 A | | 2/2006 | |

* cited by examiner

*Primary Examiner* — Lois Zheng
(74) *Attorney, Agent, or Firm* — The Webb Law Firm

(57) ABSTRACT

The object of this present invention is to provide novel means for inhibiting elution of hexavalent chromium from a chemical conversion coating. A composition for chemical conversion treatment comprises at least 0.1 g/L of a polyphenol and at least 1.5 g/L in chromium ion equivalent of an aqueous trivalent chromium compound and has a pH of 6 or less. A chemical conversion coating formed on a metallic surface of a member by contacting the surface with the composition for chemical conversion treatment has a hexavalent chromium content of 0.04 μg/cm² or less after exposure to an environment having a temperature of 80 degrees C. and a relative humidity of 100% for 120 hours. The content of hexavalent chromium is measured by a method compliant with EN15205. A composition containing at least 0.1 g/L of a polyphenol can be used as a composition for post-coating treatment of a chemical conversion coating obtained by conventional chemical conversion treatment.

3 Claims, 3 Drawing Sheets

COMPOSITION FOR CHEMICAL CONVERSION TREATMENT AND MEMBER HAVING A CHEMICAL CONVERSION COATING FORMED BY THE TREATMENT

TECHNICAL FIELD

The present invention relates to a composition for chemical conversion treatment which is able to form a chemical conversion coating from which elution of hexavalent chromium, which is harmful to the environment, is inhibited and a member having a chemical conversion coating formed by the chemical conversion treatment. More specifically, the present invention relates to a composition for chemical conversion treatment, a dense composition for preparing the composition, a method of manufacturing a member having a chemical conversion coating formed by the treatment, and a member having the chemical conversion treatment.

BACKGROUND ART

Recently, the use of hazardous metals such as lead, mercury, cadmium, and hexavalent chromium has been restricted by environmental regulations such as RoHS (Restriction of the Use of Certain Hazardous Substances in Electrical and Electronic Equipment) and ELV (End of Life Vehicles) Regulations.

In accordance with this movement, a chromate film, which is effective as an anticorrosive chemical conversion coating for a member having a metallic surface such as a galvanized member, has been formed not by a composition for chemical conversion treatment (which may be referred to below as a chemical conversion treatment solution) using a chromate salt containing hexavalent chromium but by a chemical conversion treatment solution containing trivalent chromium. A chemical conversion coating obtained from a conventional chemical conversion treatment solution containing hexavalent chromium has hexavalent chromium which is soluble in water. Therefore, use of such a film is restricted by the above-mentioned regulations.

Although a chromate film formed by a chemical conversion treatment solution containing trivalent chromium has become common, it has been found that an extremely small amount of hexavalent chromium is detected in the chemical conversion coating formed by the chemical conversion treatment solution. Depending on the method of measurement, the amount of elution from the coating is roughly 0.1 microgram/$cm^2$ or less, which is far smaller than the amount of elution from a chemical conversion coating obtained from a conventional chemical conversion treatment solution containing hexavalent chromium.

Nevertheless, methods of decreasing the amount of hexavalent chromium from a chemical conversion coating obtained from a conventional chemical conversion treatment solution containing trivalent chromium (which may be referred to below as a chemical conversion coating) are being investigated.

Patent Document 1 discloses a method of decreasing the amount of elution of hexavalent chromium by immersing a metallic member having a chemical conversion coating in a reduction treatment solution containing a prescribed content of a reducing agent for a prescribed period as a process for reducing hexavalent chromium, followed by drying the metallic member after immersion. L-ascorbic acid is preferably used as the reducing agent.

Patent Document 2 discloses a method of adding a reducing agent to reduce hexavalent chromium to trivalent chromium in a chemical conversion treatment solution. A preferable reducing agent for this method is sodium bisulfite, which is added before and after adding a supporting salt.

Patent Document 1: JP2005-240084A
Patent Document 2: JP2006-28547A

DISCLOSURE OF INVENTION

It has not been clarified why hexavalent chromium is eluted from a chemical conversion coating obtained from a chemical conversion treatment solution containing trivalent chromium. Therefore, it is not clear whether adding the above-described reducing reagents are the best means for inhibiting elution of hexavalent chromium.

In addition, while the effect of inhibiting elution of hexavalent chromium needs to last for a long period, Patent Document 2 only discloses the amount of elution just after the formation of a chemical conversion coating, and Patent Document 1 only discloses the amount of elution after 10 days of storage in a normal environment. Therefore, it is still unclear whether the effects of the above-mentioned means for inhibiting elution of hexavalent chromium can last for a long period.

Regarding this point, the inventors of the present invention measured the amount of elution of hexavalent chromium from a chemical conversion coating after storage in an environment having a high temperature and high humidity (80 degrees C. and 100% RH). The result clarified that hexavalent chromium was eluted rapidly in a short period (about 1 day) from a chemical conversion coating obtained from a chemical conversion treatment solution containing these compounds which were thought to be effective.

Therefore, the object of the present invention is to provide a novel means for inhibiting elution of hexavalent chromium from a chemical conversion coating, and specifically means for inhibiting elution of hexavalent chromium from a chemical conversion coating even after storage in an environment having a high temperature and high humidity.

The inventors of the present invention investigated how to achieve the above-mentioned object and found that a process of adding a polyphenol to a chemical conversion treatment solution or a process of contacting a solution containing a polyphenol can inhibit elution of hexavalent chromium from a chemical conversion coating after storage in an environment of high temperature and high humidity more effectively than can conventional means.

The present invention described below is achieved based on the above-mentioned knowledge and is as follows.

According to one aspect of the present invention, there is provided a composition for chemical conversion treatment (a chemical conversion treatment solution) characterized by comprising at least 0.1 g/L of a polyphenol and at least 1.5 g/L in chromium ion equivalent of an aqueous trivalent chromium compound and by having a pH of 6 or less, wherein a chemical conversion coating formed on a metallic surface of a member by contacting the metallic surface with the composition for chemical conversion treatment has a content of hexavalent chromium of 0.04 μg/$cm^2$ or less as measured by a method compliant with EN15205 after exposure to an environment having a temperature of 80 degrees C. and a relative humidity of 100% for 120 hours.

It is preferable that the polyphenol contained in the composition for chemical conversion treatment be one or more compounds selected from the group consisting of a flavonoid compound, a chlorogenic acid compound, a phenyl carbonic acid compound, and an ellagic acid compound.

It is more preferable that the polyphenol contained in the composition for chemical conversion treatment be one or more compounds selected from the group consisting of catechin, tannic acid, gallic acid, pyrogallol, hydroquinone, chlorogenic acid, quercetin, ellagic acid, fisetin, daidzein, rutin, hesperetin, and chrysin.

It is especially preferable that the polyphenol contained in the composition for chemical conversion treatment be a triphenol.

According to another aspect of the present invention, there is provided a dense composition for the preparation of the above-mentioned composition for chemical conversion treatment (a dense solution for chemical conversion treatment) characterized by comprising at least 0.5 g/L of a polyphenol and at least 7.5 g/L in chromium ion equivalent of an aqueous trivalent chromium compound.

According to yet another aspect of the present invention, there is provided a method of manufacturing a member having a chemical conversion coating characterized by treating a member having a metallic surface by the above-mentioned composition for chemical conversion treatment according to the present invention to form a chemical conversion coating on the metallic surface.

According to still another aspect of the present invention, there is provided a member having a chemical conversion coating characterized by being obtained by the above-mentioned manufacturing method.

According to further aspect of the present invention, there is provided an additive for a composition for chemical conversion treatment comprising at least 1.5 g/L in chromium ion equivalent of an aqueous trivalent chromium compound and having a pH of 6 or less, characterized by containing a polyphenol, so that the content of the polyphenol in the composition for chemical conversion treatment is at least 0.1 g/L and a chemical conversion coating formed on a metallic surface of a member by contacting the composition for chemical conversion treatment on the metallic surface of the member has a content of hexavalent chromium of 0.04 µg/cm$^2$ or less as measured by a method compliant with EN15205 after exposure to an environment having a temperature of 80 degrees C. and a relative humidity of 100% for 120 hours.

It is preferable that the polyphenol contained in the additive be one or more compounds selected from the group consisting of a flavonoid compound, a chlorogenic acid compound, a phenyl carbonic acid compound, and an ellagic acid compound.

It is more preferable that the polyphenol contained in the additive be one or more compounds selected from the group consisting of catechin, tannic acid, gallic acid, pyrogallol, hydroquinone, chlorogenic acid, quercetin, ellagic acid, fisetin, daidzein, rutin, hesperetin, and chrysin.

It is especially preferable that the polyphenol contained in the additive be a triphenol.

According to still another aspect of the present invention, there is provided a method of manufacturing a member having a chemical conversion coating, characterized by comprising a chemical conversion treatment step of forming a chemical conversion coating on a metallic surface of a member by contacting the metallic surface with a composition for chemical conversion treatment comprising an aqueous trivalent chromium compound, and a post-coating treatment step of contacting the chemical conversion coating with a composition for a post-coating treatment comprising at least 0.1 g/L of a polyphenol and having a pH of 6 or less, the chemical conversion coating obtained from the post-coating treatment having a content of hexavalent chromium of 0.015 µg/cm$^2$ or less as measured by a method compliant with EN15205 after exposure to an environment having a temperature of 80 degrees C. and a relative humidity of 100% for 120 hours.

It is preferable that the polyphenol contained in the composition for the post-coating treatment (a post-treatment solution) be one or more compounds selected from the group consisting of a flavonoid compound, a chlorogenic acid compound, a phenyl carbonic acid compound, and an ellagic acid compound.

It is more preferable that the polyphenol contained in the composition for the post-coating treatment be one or more compounds selected from the group consisting of pyrogallol, hydroquinone, chlorogenic acid, quercetin, ellagic acid, fisetin, daidzein, rutin, hesperetin, and chrysin.

It is especially preferable that the polyphenol contained in the composition for the post-coating treatment be a triphenol.

According to still another aspect of the present invention, there is provided a composition for post-coating treatment comprising the above-described manufacturing method characterized by containing at least 0.1 g/L of a polyphenol.

According to the present invention, the amount of elution of hexavalent chromium from a chemical conversion coating obtained from a chemical conversion treatment solution containing trivalent chromium can be 0.04 µg/cm$^2$ or less after exposure to an environment having a temperature of 80 degrees C. and a relative humidity of 100% for 120 hours, the amount of hexavalent chromium being measured by a method compliant with EN15205. In a preferable embodiment, tarnish formation on the chemical conversion coating is inhibited.

BEST MODE FOR CARRYING OUT THE INVENTION

1. Composition for Chemical Conversion Treatment

Figure 1:
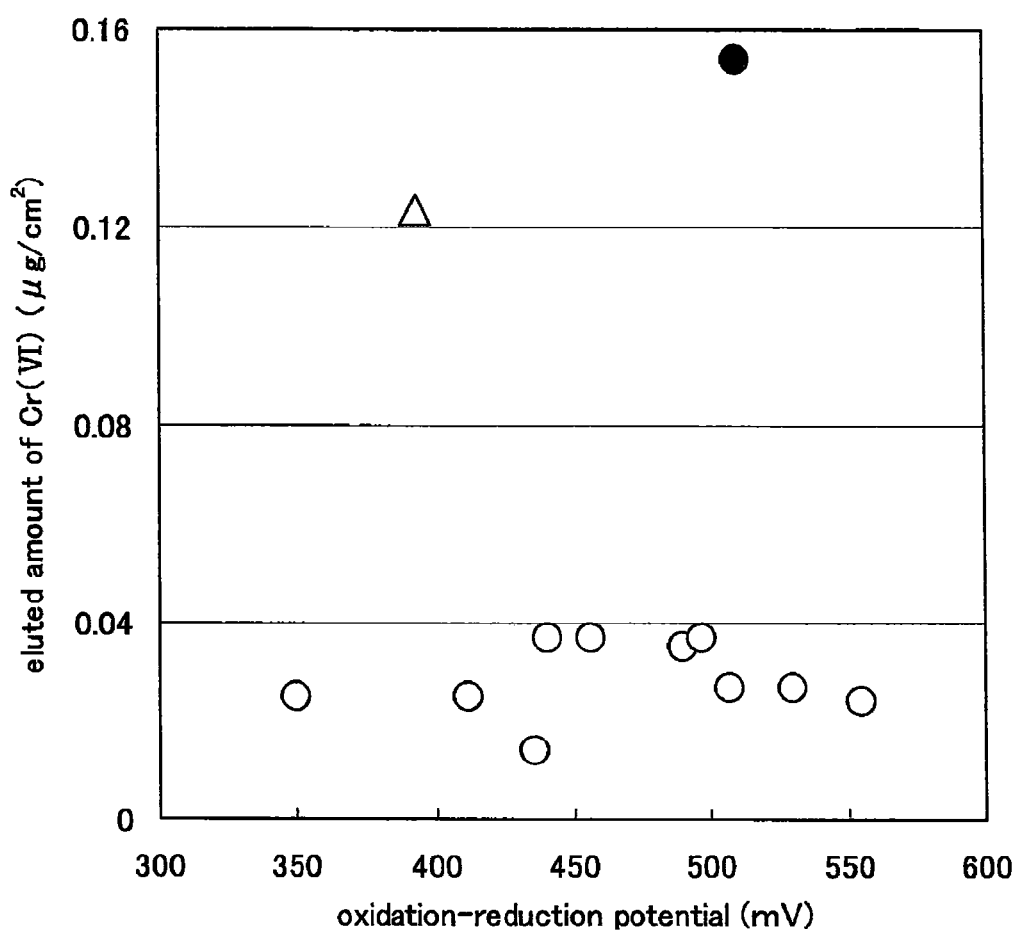
FIG. 1 is a graph of the relation between the hexavalent chromium content of a chemical conversion coating obtained from a chemical conversion treatment solution containing 0.1 g/L of a polyphenol, 0.1 g/L of sodium bisulfate, or no particular additional compound, and the oxidation-reduction potential of the chemical conversion treatment solution, wherein the hexavalent chromium content is measured by a method compliant with EN15205 after exposure of the chemical conversion coating to an environment having a temperature of 80 degrees C. and a relative humidity of 100% for 120 hours, which may be referred to below as the amount of elution after 120 hours.

A composition for chemical conversion treatment (a chemical conversion treatment solution) according to the present invention is an aqueous composition comprising at least 0.1 g/L of a polyphenol and at least 1.5 g/L in chromium ion equivalent of an aqueous trivalent chromium compound, the composition having a pH of 6 or less.

The effect of inhibiting elution of hexavalent chromium is obtained by means of a polyphenol content which is at least 0.1 g/L. There is no upper limit on the polyphenol content. The upper limit on the content may be determined based on the solubility of the polyphenol in a dense solution for chemical conversion treatment according to the present invention, which will be described below. The upper limit on the content may be also determined from the viewpoint of the generation of insoluble byproducts or tarnish formation on the surface of the chemical conversion coating because these problems sometimes become more obvious as the total amount of the surface area on which the chemical conversion treatment is performed increases.

The pH of the solution may be 6 or less from the viewpoint of ensuring that a polyphenol can work sufficiently. It is preferable that the pH be 4 or less in view of the stability in the formation of a chemical conversion coating, and a pH of 3 or less is more preferable.

A chemical conversion coating from which elution of hexavalent chromium is inhibited is formed by contacting the chemical conversion treatment solution according to the present invention with a member having a metallic surface. It is impossible to give an unambiguous definition of the treatment temperature because the temperature depends on the content of components in the chemical conversion treatment solution or the pH of the chemical conversion treatment solution. It is preferable that the contacting period of the member with the chemical conversion treatment solution be 10 seconds or more when the temperature of the chemical conversion treatment is 20 degrees C. or more, and that the period of contact be 1 to 10 seconds when the temperature of the chemical conversion treatment is 40 degrees C. or more. Any means can be employed for contacting the member with the chemical conversion treatment solution. Examples of means for contacting include immersion of a member having a metallic surface in the chemical conversion treatment solution according to the present invention and spraying the chemical conversion treatment solution onto the member.

Components of the chemical conversion treatment solution according to the present invention will next be described.

(1) Aqueous Trivalent Chromium Compound

The chemical conversion treatment solution according to the present invention contains an aqueous compound which can provide trivalent chromium in water, which may be referred to below as a trivalent chromium compound. The content of the trivalent chromium is 1.5 to 10 g/L in chromium ion equivalent and it is preferable that the content be 2 to 7 g/L.

Examples of the trivalent chromium include a chromate salt of trivalent chromium such as chromium chloride, chromium sulfide, chromium nitride, chromium phosphate, and chromium acetate. Examples of the trivalent chromium also include a compound having trivalent chromium, which is formed by the reduction of a hexavalent chromium compound such as chromic acid and a bichromate. The trivalent chromium may consist of a single species or of multiple species. The chemical conversion treatment solution according to the present invention does not substantially contain hexavalent chromium because a hexavalent chromium compound is not added to a chemical conversion treatment solution according to the present invention as a source reagent.

(2) Polyphenol

A chemical conversion treatment solution according to the present invention contains a polyphenol in order to inhibit elution of hexavalent chromium from a chemical conversion coating formed by the chemical conversion treatment solution. "Polyphenol" is a generic term for a compound which has a benzene ring having multiple hydroxyl groups and it may be referred to as a polyhydric phenol or an arene polyol. Many species of polyphenols are found in natural compounds, and such natural polyphenol compounds can be classified roughly as flavonoid compounds or non-flavonoid compounds.

A flavonoid compound consists of a $C_6$-$C_3$-$C_6$ carbon skeleton and includes a compound which has two phenyl groups which are bonded to three carbon atoms having the structure of a pyran ring or a structure similar to a pyran ring between the phenyl groups. A flavonoid compound is also classified according to the partial structure formed by the three center carbon atoms. Examples of a flavonoid compound include an isoflavone compound, a flavonol compound, a flavanone compound, an anthocianin compound, a flavanol compound, and a flavan compound.

Examples of a non-flavonoid compound include a chlorogenic acid compound, a phenyl carbonic acid compound, an ellagic acid compound, a lignan, a curcumin compound, and a coumarin compound.

Examples of the polyphenol include gallic acid, pyrogallol, tannic acid, hesperidin, catechin, quercetin, daidzein, procyanidin (also known as proanthocyanidin), theaflavin, isoflavone, curcumin, rosmarinic acid, xanthone, epicatechin, phlorotannin, chlorogenic acid, caffeic acid, ellagic acid, rutin, anthocyanin, nasunine, chalcone, dihydrochalcone, aurone, flavanone, flavone, dihydroflavonol, flavonol, flavan, isoflavonoid, neoflavonoid, coumarin, lignan, hydroquinone, catechol, resorcinol, hesperetin, chrysin, fisetin, and ferulic acid.

The polyphenol usable in the present invention is defined to include a derivative of a polyphenol which has at least one functional group which can be hydrolyzed to form a hydroxyl group bonded to an aromatic ring. Such a functional group includes an alkoxyl group and an ester group.

The polyphenol may consist of a single species or multiple species.

It is not altogether clear why the polyphenol is effective against elution of hexavalent chromium from a chemical conversion treatment. There is a possibility that the polyphenol reduces the reactivity of a free radical species which is said to be involved in the reaction from trivalent chromium to hexavalent chromium. There is also a possibility that the polyphenol promotes a phenomenon in which hexavalent chromium which is generated in a chemical conversion coating is bonded to a material constituting a chemical conversion coating or the substrate on which the chemical conversion coating is formed, and specifically, the polyphenol may be involved with a chelating reaction or a cross-linking reaction with hexavalent chromium.

Although the above-described patent documents disclose means for inhibiting elution of hexavalent chromium by reducing reagents, it is not understood that the polyphenol usable in the present invention inhibits elution of hexavalent chromium because of its reducing character. The reason for the understanding is described below with reference to FIG. 1.

FIG. 1 is a graph of the relation between the amount of elution after 120 hours of a chemical conversion coating obtained from a chemical conversion treatment solution containing 0.1 g/L of a polyphenol, 0.1 g/L of sodium bisulfate, or no particular additional compound, and the oxidation-reduction potential of the chemical conversion treatment solution.

In the figure, the characters "○" indicate the results for chemical conversion treatment solutions containing 0.1 g/L of different polyphenols, the character "●" indicates the result for a chemical conversion treatment solution without additives, and the character "Δ" indicates the result for a chemical conversion treatment solution containing 0.2 g/L of sodium bisulfate for comparison.

As shown in FIG. 1, while the oxidation-reduction potential of a chemical conversion treatment solution without additives is more than 500 mV, the potential decreases to less than 400 mV when sodium bisulfate is added to the chemical conversion treatment solution. Therefore, the reducing character of the chemical conversion treatment solution becomes stronger, and it is thought that the oxidation of trivalent chromium in the chemical conversion treatment solution to hexavalent chromium is inhibited. However the amount of elution after 120 hours is not affected by addition of sodium bisulfate. Therefore, a high content of hexavalent chromium which is more than 0.1 µg/cm² is measured while the amount of elution after 120 hours is slightly smaller than the amount in comparison to a chemical conversion treatment solution without additives.

On the other hand, in the case of the chemical conversion treatment solution having 0.1 g/L of a polyphenol, the amount of elution after 120 hours is inhibited to 0.04 µ/cm² or less, and a positive correlation cannot be found between the amount of elution after 120 hours and the oxidation-reduction potential. The coefficient of correlation (R) is calculated to be 0.14, which is considered a lack of correlation. Furthermore, some of the chemical conversion treatment solutions have an oxidation-reduction potential which is higher than the potential of the chemical conversion treatment solution without additives. Despite this fact, the amount of elution after 120 hours of the chemical conversion treatment solutions containing a polyphenol is lower than the amount of elution after 120 hours of the chemical conversion treatment solution without additives.

Accordingly, it is impossible to conclude that the amount of elution of a chemical conversion coating formed from a chemical conversion treatment solution containing a polyphenol decreases after 120 hours because of the reducing character of the polyphenol.

The content of the polyphenol in the chemical conversion treatment solution can be determined based on the ability of the solution to decrease the amount of elution after 120 hours of a chemical conversion coating obtained from the chemical conversion treatment solution, or the solubility of the polyphenol in a dense solution for chemical conversion treatment described below when the dense solution is used. When the content of the polyphenol is 0.1 g/L or more, it is possible to stably obtain the effect of reducing the amount of elution after 120 hours to 0.04 µg/cm² or less. Although the effect of inhibiting elution of hexavalent chromium lasts longer as the content of the polyphenol increases, a chemical conversion coating may be tarnished or the quality of the chemical conversion coating may be destabilized because of by-products in the chemical conversion treatment solution when the content of the polyphenol is excessive. Therefore, it is preferable that the content of the polyphenol be 0.1 to 1.0 g/L, and it is especially preferable that the content be 0.2 to 0.5 g/L. It is preferable in view of inhibiting the effect of by-products that the content of the polyphenol in the chemical conversion treatment solution become lower as the area of the chemical conversion coating which is formed increases, namely, as aging of the chemical conversion treatment solution progresses.

It is preferable in view of the stability of chemical conversion treatment that the ratio of the molar content of trivalent chromium to the molar content of the polyphenol be in the range of 1 to 200, and it is especially preferable that the ratio be in the range of 4 to 50.

It is particularly preferable that the chemical conversion treatment solution according to the present invention contain a triphenol or a compound which forms a triphenol on hydrolysis. A compound which has a residual structure shown in the following chemical formula exhibits excellent properties.

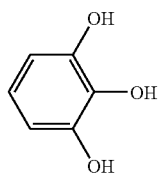

Examples of the above-mentioned compound include pyrogallol, 5-methylpyrogallol, 5-propylpyrogallol, gallic acid, and an ester of gallic acid, e.g., tannic acid. Hydrogen in the hydroxyl group of the above-mentioned compound may be substituted by an alkyl group. Such a compound includes pyrogallol-1,3-dimethylether, pyrogallol-1,3-diethylether, and 5-propylpyrogallol-1-methylether (4) Other Components The chemical conversion treatment solution according to the present invention can also contain one or more compounds selected from the group consisting of metal ions, an organic acid and anion of the acid, an inorganic acid and anion of the acid, an inorganic colloid, a silane coupling agent, a sulfur compound, and a fluorine compound. The chemical conversion treatment solution can further contain one or more compounds selected from the group consisting of a polymer such as a wax, a corrosion inhibitor, a surfactant such as a diol, a triol, and an amine, a plastic dispersive material, a colorant, a pigment, a pigment-producing agent such as a metal pigment-producing agent, a desiccant, and a dispersant.

Examples of the metal ion include an ion of Co, Ni, Na, K, Ag, Au, Ru, Nb, Ta, Pt, Pd, Fe, Ca, Mg, Zr, Sc, Ti, V, Mn, Cu, Zn, Sn, Y, Mo, Hf, and W. The metal ion can exist in the form of an oxygen acid ion such as a vanadate ion or tungstate ion.

Examples of the organic acid include a monocarboxylic acid such as formic acid, acetic acid, and propionic acid; a dicarboxylic acid such as oxalic acid, malonic acid, succinic acid, glutaric acid, adipic acid, pimelic acid, suberic acid, azelaic acid, sebacic acid, maleic acid, phthalic acid, and terephthalic acid; a tricarboxylic acid such as tricarballylic acid; a hydroxycarboxyl acid such as glycolic acid, lactic acid, malic acid, tartaric acid, citric acid, and ascorbic acid; and an aminocarboxylic acid such as glycine and alanine.

Examples of the inorganic acid include a halogen acid such as hydrochloric acid, hydrofluoric acid, and hydrobromic acid, chloric acid, perchloric acid, chlorite acid, hypochlorous acid, sulfuric acid, sulfurous acid, nitric acid, nitrous acid, phosphoric acid (orthophosphoric acid), polyphosphoric acid, metaphosphoric acid, pyrophosphoric acid, ultraphosphoric acid, hypophosphorous acid, and perphosphoric acid. It is preferable that one or more compound selected from the group consisting of a halogen acid, sulfuric acid, nitric acid, and phosphoric acid (orthophosphoric acid) be contained in the form of an anion.

The contents of the above-described acids and/or ions of the acids are not limited. Generally speaking, the ratio of the total content of these acid components to the total content of trivalent chromium and the above-described metal ions is in the range of 0.1 to 10, and it is preferable that the ratio be in the range of 0.5 to 2.

Examples of the inorganic colloid include a silica sol, an alumina sol, a titanium sol, and a zirconium sol. Examples of the silane coupling agent include vinyltriethoxy silane and gamma-metacryloxypropyltrimethoxy silane.

Examples of the sulfur compound include sulfurous acid and sulfite, disulfurous acid and disulfite, and an organic or inorganic compound containing —SH (mercapto group), —S— (thioether group), >C=S (thioaldehyde group, thioketone group), —COSH (thiocarboxy group, —CSSH (dithiocarboxy group), —CSNH$_2$ (thioamide group), and/or —SCN (thiocyanate group, isocyanate group). Such an organic or inorganic compound includes ammonium thioglycolate, thioglycolic acid, thiomaleic acid, thioacetamide, dithioglycolic acid, ammonium dithioglycolate, ammonium dithiodiglycolate, dithiodiglycolic acid, cysteine, saccharin, thiamine nitrate, sodium N,N-diethyl-dithiocarbamate, 1,3-diethyl-2-thiourea, N-thiazole-2-sulfuramylamide, 1,2,3-benzotriazole, 2-thiazolin-2-thiol, thiazole, thiourea, thiozole, sodium thioindoxylate, o-sulfonamidobenzoic acid, sulfanilic acid, orange-II, methyl orange, naphthionic acid, naphtalene-alpha-sulfonic acid, 2-mercaptobenzothiazole, 1-naphthol-4-sulfonic acid, Schaeffer's acid (6-hydroxy-2-Naphthalene-sulfonic acid), sulfadiazine, ammonium thiocyanate, potassium thiocyanate, sodium thiocyanate, rhodanine, ammonium sulfide, sodium sulfide, ammonium sulfate, thioglycerin, thioacetic acid, potassium thioacetate, thiodiacetic acid, 3,3-thiodipropionic acid, and thiosemicarbazide.

2. Dense Composition for Preparing the Chemical Conversion Treatment Solution

It is preferable to prepare an aqueous composition 5 to 20 times concentrated as the above-described chemical conversion treatment solution, which may be referred to below as a dense solution for chemical conversion treatment, because the dense solution does not require weighing each component separately and the dense solution is easy to store. When the dense solution for chemical conversion treatment is prepared, the upper limit on the content of the dense solution is determined in view of the solubility of a polyphenol in the solution. Specifically, a composition including at least 0.5 g/L of a polyphenol and at least 7.5 g/L in chromium ion equivalent of an aqueous trivalent chromium compound can easily provide the above-mentioned chemical conversion treatment solution by a process of diluting the composition an appropriate number of times with a prescribed solvent, for which water may be normally used, so that the diluted solution has at least 0.1 g/L of a polyphenol and at least 1.5 g/L in chromium ion equivalent of an aqueous trivalent chromium compound.

3. Additive to be Added to a Composition for a Chemical Conversion Treatment

A composition having a polyphenol which is contained in the chemical conversion treatment solution according to the present invention can be used as an additive for a conventional chemical conversion treatment solution containing trivalent chromium. The additive may be added when a chemical conversion treatment solution is prepared, or the additive may be added according to the cumulative area of the chemical conversion coating which is formed. The volume of the additive may be determined so that the content of the polyphenol in the chemical conversion treatment solution after addition is at least 0.1 g/L. It is preferable that the content of the polyphenol in the chemical conversion treatment solution after addition be 1.0 g/L or less in view of inhibiting tarnish formation on the chemical conversion coating, and it is especially preferable that the content be in the range of 0.2 to 0.5 g/L in view of the balance between inhibiting elution of hexavalent chromium from a chemical conversion coating and inhibiting tarnish formation on the chemical conversion coating. In general, the content of the polyphenol in the additive is 5 to 20 times the content of the polyphenol in a chemical conversion treatment solution, and hence the content of the polyphenol in the additive is preferably 0.5 g/L or more, which is similar to the dense solution for chemical conversion treatment. The upper limit on the content of the polyphenol in the additive is also determined based on the solubility of the polyphenol in the additive, which is also similar to the dense solution for chemical conversion treatment. A preferable solvent for the additive is water, although, the solvent may contain an organic solvent which is soluble in water, e.g., alcohol.

4. Composition for a Post-Coating Process Performed after Chemical Conversion Treatment A composition having a polyphenol contained in the chemical conversion treatment solution according to the present invention can be used as a composition for a post-coating process for a chemical conversion coating formed by a conventional chemical conversion treatment solution containing trivalent chromium, which may be referred to below as a post-treatment solution. The post-treatment solution can be applied to a chemical conversion coating formed by a chemical conversion treatment solution containing the polyphenol usable in the present invention. The solvent for the post-treatment solution may be water, and the solvent may contain an organic solvent which is soluble in water, e.g., alcohol.

Any polyphenol which can be used in the chemical conversion treatment solution according to the present invention can be used in the post-treatment solution. When the post-treatment solution is applied to a chemical conversion coating formed by a chemical conversion treatment solution containing a polyphenol usable in the present invention, the polyphenol contained in the post-treatment solution can be same as or different from the polyphenol contained in the chemical conversion treatment solution.

The post-treatment solution can work stably when the content of the polyphenol in the post-treatment solution is 0.1 g/L or more. The upper limit on the content of polyphenol is unrestricted because the limit is determined based on the solubility of the polyphenol in the post-treatment solution. Nevertheless, it is preferable that the content be 10 g/L or less, and 7 g/L or less is especially preferable because the possibility of the generation of by-products increases when the content is too high.

Any value of the pH of the post-treatment solution is acceptable as long as the polyphenol in the post-treatment solution can exhibit the function of inhibiting elution of hexavalent chromium. The pH is 6 or less in general, and it is preferably 4 or less and especially preferably 3 or less. It is impossible to make an unambiguous definition of the treatment temperature for the post-coating treatment because the temperature depends on the content of components in the post-treatment solution or the pH of the post-treatment solution. It is preferable that the length of a period of contacting a chemical conversion coating with the post-treatment solution be 10 seconds or more when the temperature of the post-coating treatment is 20 degrees C. or more, and that the length of a period of contacting be 1 to 10 seconds when the temperature of the post-coating treatment is 40 degrees C. or more. When treatment conditions become excessive, which includes a case in which the temperature becomes excessively high and a case in which the treatment period becomes excessively long, the possibility of the generation of by-products increases, and there is a concern of the load of cleaning the chemical conversion coating on which the post-treatment is carried out increasing and of the productivity of the post-coating treatment decreasing. Any means can be employed for contacting the chemical conversion coating with the post-treatment solution. Examples of the means include immersion of a member having a chemical conversion coating in the post-treatment solution according to the present invention and spraying the post-treatment solution onto a member having a chemical conversion coating.

The above-described post-treatment solution can contain any compound which can be contained in a chemical conversion treatment solution as long as the polyphenol is contained in the post-treatment solution. The post-treatment solution may contain one or more components selected from the group consisting of silicon and a resin containing silicon, a resin containing microparticles such as polyfluorotetraethylene, wax and a coating agent containing wax, and a pigment and a colorant. An additional post-treatment solution containing the above-described components may be prepared in addition to the above-described post-treatment solution and treatment with the additional post-treatment solution may be performed after the treatment with the post-treatment solution.

5. Method of Measuring Hexavalent Chromium in a Chemical Conversion Coating

The content of hexavalent chromium per area of the chemical conversion coating according to the present invention is measured by the following method, which is based on a diphenylcarbazide colorimetric method defined by EN (European Norm) 15205:2006.

A specimen is cut so that the area of the chemical conversion coating on the specimen is 50±5 $cm^2$ and the specimen after cutting is placed into a beaker. The specimen after cutting is left at room temperature in this method while the specimen is heated as pretreatment in EN 15205:2006. 55 ml of water having a conductance of 1 µS/cm or less, which may be obtained from percolation through an ion exchange column or distillation, are placed in the beaker. The upper end of the beaker containing water is covered with a sheet, and the water in the beaker is boiled for 10 minutes without a boiling stone in the beaker. After boiling, the beaker is cooled in air to room temperature, and the cooled specimen is removed from the beaker. The volume of water in the beaker from which the specimen is removed is made 50 ml by appropriate addition of water. 1 ml of 75% orthophosphoric acid and 1 ml of a diphenylcarbazide solution are added to the 50 ml solution. The diphenylcarbazide solution is prepared by dissolving 1.0 g of 1,5-diphenylcarbazide in 70 ml of acetone followed by adding acetone so that the total volume of the solution becomes 100 ml. The diphenylcarbazide solution should be stored in a cool and dark space and used within 4 weeks of preparation. The above-described solution containing phosphoric acid and the diphenylcarbazide solution after standing for 10 minutes is subjected to measurement of absorbance. At the same time, a standard solution is prepared by dissolving 0.113 g of potassium chromate in 1000 ml of water and adding 1 ml of 75% orthophosphoric acid and 1 ml of a diphenylcarbazide solution to the solution containing potassium chromate. The absorbance of the standard solution after standing for ten minutes is measured. The hexavalent chromium content in the specimen solution is calculated based on the absorbance of the standard solution, and the hexavalent chromium content per area of the specimen is estimated from the result of calculation.

The chemical conversion coating to be measured is exposed to an environment having a high temperature and high humidity for a prescribed period in order to accelerate elution of hexavalent chromium from the chemical conversion coating. Exposure to an environment having a high temperature and high humidity is carried out by storing the specimen on which the chemical conversion coating is formed in a constant-temperature and constant-humidity oven, the atmosphere in which is kept at a temperature of 80 degrees C. and a relative humidity of 100% for 120 hours. Measuring a chemical conversion coating in which the generation of hexavalent chromium is accelerated to some degree as described above makes it possible to evaluate the long-term inhibition of elution. A product containing a member on which a chemical conversion coating is formed is sometimes located in an environment having a high temperature and high humidity, such as in Southeast Asia. Therefore, exposure to such an environment having a high temperature and high humidity has not only an aspect of an accelerated test but also an aspect of a real use environment.

When the above-described measurement is performed on a member which is treated by a chemical conversion treatment solution containing a polyphenol usable in the present invention and the member is exposed to an environment having a high temperature and high humidity, namely, an environment having a temperature of 80 degrees C. and a relative humidity of 100% for 120 hours as pretreatment before measurement, a hexavalent chromium content in the chemical conversion coating of 0.04 µg/$cm^2$ or less is stably achieved. The content of hexavalent chromium of a chemical conversion coating obtained by chemical conversion treatment which does not employ the polyphenol usable in the present invention, namely, by treatment using a conventional chemical conversion treatment solution is typically 0.15 µg/$cm^2$. Therefore, the chemical conversion coating according to the present invention can reduce the amount of elution of hexavalent chromium by one third in comparison with a conventional chemical conversion coating.

In addition, when treatment by immersing a member after a conventional chemical conversion treatment in a post-treatment solution having an appropriate content of a proper polyphenol is performed, the content of hexavalent chromium in the chemical conversion coating after storage in a constant-temperature and constant-humidity oven in which the atmosphere is kept at a temperature of 80 degrees C. and a relative humidity of 100% for 120 hours becomes 0.015 µg/$cm^2$ or less. This content is lower than 10% of the content of hexavalent chromium of a chemical conversion coating without the post-coating treatment.

When a different method for measuring the content of hexavalent chromium, such as the method defined by JIS H8625 or the so-called VOLVO method, is performed, the measured content of hexavalent chromium is different from the content measured by the above-described method because in the different methods treatment for elution of hexavalent chromium is different. Nevertheless, the content of hexavalent chromium in the chemical conversion coating according to the present invention as measured by any measurement method is much lower than the hexavalent chromium content in a conventional chemical conversion coating.

6. Member on which Chemical Conversion Treatment is Performed

Any material can be employed for a member on which chemical conversion treatment is performed as long as the member has a metallic surface on which a chromate film can be formed because the chemical conversion treatment according to the present invention relates to inhibition of elution of hexavalent chromium from a chromate film formed by a chemical conversion treatment solution containing trivalent chromium. A preferable material is metal, and a steel plate on which zinc-based plating is formed is especially preferable.

The zinc-based plating may consist of pure zinc or a zinc alloy containing aluminum, for example. The plating may be formed by electroplating or galvanizing, which includes galvanealing.

EXAMPLE 1

Although the present invention will be concretely described below with respect to examples, the invention should not be considered as being in any way limited to these examples.

(1) Preparation of a Test Plate

Each of the Compounds shown in TABLE 1, which were prepared for inhibiting elution of hexavalent chromium and which may be generally referred to as elution inhibitors, were added to a conventional dense solution for a chemical conversion coating containing trivalent chromium. Chemical conversion treatment was performed using the prepared chemical conversion treatment solutions to evaluate the effects of the elution inhibitors. In TABLE 1, 1-7 indicates a chemical conversion treatment solution without an elution inhibitor, each of 1-1 to 1-6 indicates a chemical conversion treatment solution containing the elution inhibitor according to the present invention, and each of 1-8 to 1-10 indicates a chemical conversion treatment solution containing an elution inhibitor which does not relate to the present invention. The details of preparation of a test plate are described below.

A chemical conversion treatment solution containing 100 ml/l of METASU YMA-BM, which is a product of Yuken Industry Co., Ltd. and in which the above-described elution inhibitors having the contents shown in Table 1 were added, and 10 ml/l of METASU YFA-30HR, which is a product of Yuken Industry Co., Ltd., was prepared. Ion-exchanged water was used as a dilution solvent in this preparation. The pH of the chemical conversion treatment solution was controlled to be 2.0 using nitric acid and sodium hydroxide. The content of trivalent chromium in the prepared chemical conversion treatment solution was 3.9 g/l.

A conventional alkali degreasing process was performed on a galvanized steel plate (5 cm×5 cm×1 mm thick, surface area of 50 cm$^2$), and the degreased plate was washed with water, after which the washed plate was immersed in a nitric acid solution (nitric acid content of 5 g/l, solution temperature of 20 degrees C., and immersion period of 10 seconds) in order to activate the surface of the galvanized steel plate. The steel plate after activation was immersed for 40 seconds in the above-described chemical conversion treatment solution, the temperature of which was at kept 40 degrees C. After the test plate taken out of the chemical conversion treatment solution, it was washed with water and dried for 10 minutes at a temperature of 70 degrees C. plus or minus 10 degrees C. The dried test plate was stored in a constant-temperature and constant-humidity oven having an atmosphere kept at a temperature of 80 degrees C. and a relative humidity of 100% for one day so that elution of hexavalent chromium from the chemical conversion coating on the test plate was accelerated.

The appearance of each test plate was investigated with the naked eye as to whether tarnish formation occurred. The evaluation criterion was as follows: (A) no tarnish formation observed, (B) slight tarnish formation observed, and (C) prominent tarnish formation observed.

(3) Evaluation Result

As shown in Table 1, an excellent effect of inhibiting elution of hexavalent chromium was obtained when the polyphenol usable in the present invention was added to a chemical conversion treatment solution as an elution inhibitor in comparison not only to a chemical conversion treatment solution without an elution inhibitor but also to a chemical conversion treatment solution having an elution inhibitor according to the prior art.

EXAMPLE 2

(1) Preparation of a Test Plate

Processes which were the same as the alkali degreasing process to the washing process after the chemical conversion treatment described in Example 1 were performed on steel plates having the same shape as the steel plate described in Example 1. The chemical conversion treatment solution of test number 1-7 was used in the chemical conversion treatment. Each of the test plates after the washing process was immersed for 5 seconds in a post-treatment solution (solvent: ion-exchanged water) which contained a polyphenol having the content indicated in TABLE 2 and which was maintained at a temperature of 25 degrees C. Each test plate after immersion was washed and dried to obtain a test plate having a chemical conversion coating on which the post-coating treatment was performed. No by-products were found in any of the post-treatment solutions after the immersion.

(2) Evaluation Method

The obtained test plates were stored in a constant-temperature and constant-humidity oven, the atmosphere in which was kept at a temperature of 80 degrees C. and a relative humidity of 100% for one day. The test plates after storage were evaluated from the viewpoints of both the hexavalent chromium content in the chemical conversion coating and the appearance of the chemical conversion coating. The method of measuring the content of hexavalent chromium and the criterion for evaluating of the appearance were similar to these described in Example 1.

TABLE 1

| test No. | 1-1 | 1-2 | 1-3 | 1-4 | 1-5 | 1-6 | 1-7 | 1-8 | 1-9 | 1-10 |
|---|---|---|---|---|---|---|---|---|---|---|
| elution inhibitor | catechin | tannic acid | gallic acid | pyrogallol | hydroquinone | hydroquinone | without addition | sodium bisulfate | L-ascorbic acid | glucose |
| content before dilution (g/L) | 5 | 5 | 5 | 5 | 0.5 | 2 | 0 | 2 | 2 | 5 |
| content in the chemical conversion treatment solution (g/L) | 0.5 | 0.5 | 0.5 | 0.5 | 0.05 | 0.2 | 0 | 0.2 | 0.2 | 0.5 |
| hexavalent chromium content (μg/cm$^2$) | 0.022 | 0.030 | 0.032 | 0.035 | 0.055 | 0.038 | 0.090 | 0.072 | 0.051 | 0.123 |
| appearance | A | C | A | B | A | A | A | A | A | A |

(2) Evaluation Method

The following evaluation was performed on the test plates after storage in the constant-temperature and constant-humidity oven.

The content of hexavalent chromium contained in the chemical conversion coating formed on each test plate was measured by a method compliant with EN15205.

(3) Evaluation Result

The content of hexavalent chromium in each of the chemical conversion coatings after the post-coating treatment is indicated in TABLE 2 (average content: 0.03 μg/cm$^2$), which shows that elution of hexavalent chromium from each of the chemical conversion coatings was inhibited compared to test number 1-7 with a hexavalent chromium content of 0.090 μg/cm².

TABLE 2

| test No. | 2-1 | 2-2 | 2-3 | 2-4 | 2-5 | 2-6 |
|---|---|---|---|---|---|---|
| elution inhibitor | catechin | tannic acid | gallic acid | pyrogallol | hydroquinone | hydroquinone |
| content before dilution (g/L) | 5 | 5 | 5 | 5 | 0.5 | 2 |
| content in the chemical conversion treatment solution (g/L) | 0.5 | 0.5 | 0.5 | 0.5 | 0.05 | 0.2 |
| hexavalent chromium content (μg/cm²) | 0.018 | 0.015 | 0.015 | 0.021 | 0.055 | 0.035 |
| appearance | A | C | A | B | A | A |

EXAMPLE 3

Steel plates having the same shape as the steel plate described in Example 1 were subjected to processes which were the same as the alkali degreasing process to the washing process after the chemical conversion treatment described in Example 1. One of the chemical conversion treatment solutions of test numbers 1-2 to 1-4 and 1-7 to 1-9 was used in each chemical conversion treatment. These test plates were stored in a constant-temperature and constant-humidity oven, the atmosphere in which was kept at a temperature of 80 degrees C. and a relative humidity of 100% for a prescribed period. After storage for the prescribed period, the test plates were taken out of the constant-temperature and constant-humidity oven, and the content of hexavalent chromium contained in the chemical conversion coating on each test plate after the storage was measured by the above-described method based on EN 15205.

Figure 2:
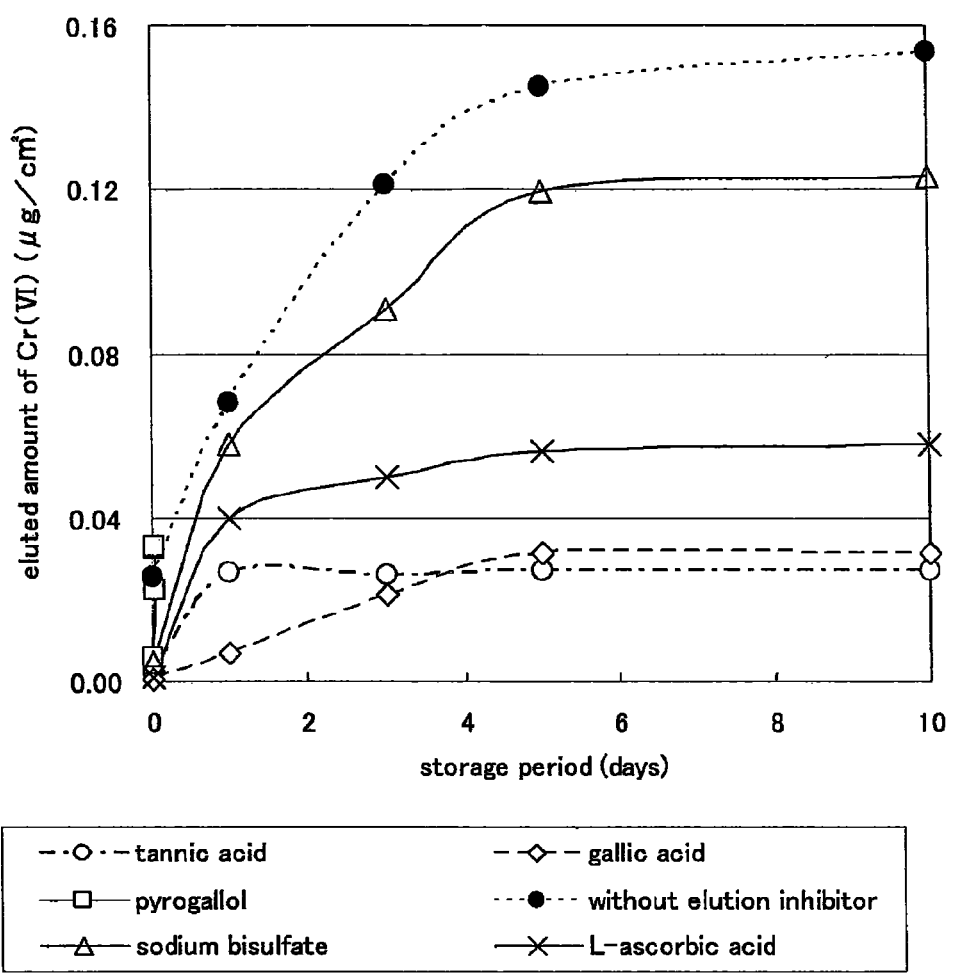
FIG. 2 is a graph of the results of measuring the amounts of elution after 120 hours.

The results of measurement are shown in FIG. 2. This figure shows that elution of hexavalent chromium in the chemical conversion coating obtained from the chemical conversion treatment solution according to the present invention was inhibited not only just after formation of a test plate but also after exposure to an environment having a high temperature and high humidity for a prescribed period.

EXAMPLE 4

A chemical conversion treatment solution containing 100 ml/l of METASU YMA-BM, which is a product of Yuken Industry Co., Ltd. and to which a polyphenol having the content shown in TABLE 3 was added, and 10 ml/l of METASU YFA-30HR which is a product of Yuken Industry Co., Ltd. was prepared. Ion-exchanged water was used as a dilution solvent in this preparation. The pH of the chemical conversion treatment solution was controlled to be 2.0 by using nitric acid and sodium hydroxide. The content of trivalent chromium in the prepared chemical conversion treatment solution was 3.9 g/l. For comparison, a chemical conversion treatment solution without addition of an elution inhibitor and a chemical conversion treatment solution containing 0.2 g/L of sodium bisulfate were prepared.

A conventional alkali degreasing process was performed on a galvanized steel plate (5 cm×5 cm×1 mm thick, surface area of 50 cm²), the degreased plate was washed with water, and then the washed plate was immersed in a nitric acid solution (nitric acid content of 5 g/l, solution temperature of 20 degrees C., immersion period of 10 seconds) in order to activate the surface of the galvanized steel plate. The test plate was immersed for 40 seconds in one of the above-described chemical conversion treatment solutions, the temperature of which were kept 40 degrees C. After being removed from the chemical conversion treatment solution, the test plat was washed with water and dried for 10 minutes at a temperature of 70 degrees C. plus or minus 10 degrees C. The dried test plate was stored in a constant-temperature and constant-humidity oven, the atmosphere in which was kept at a temperature of 80 degrees C. and a relative humidity of 100%, for a prescribed period so that elution of hexavalent chromium from the chemical conversion coating on the test plate was accelerated.

The content of hexavalent chromium in the chemical conversion coating formed on each test plate after storage in the constant-temperature and constant-humidity oven was measured by the method described in Example 1.

The results are shown in TABLE 3. For a test plate having a chemical conversion coating obtained from a chemical conversion treatment solution without an elution inhibitor (test number 4-1) and a test plate having a chemical conversion coating obtained from a chemical conversion treatment solution to which sodium bisulfate was added (test number 4-2), the results for a storage period of 240 hours are shown in the column for a storage period of 216 hours in the table.

Figure 3:
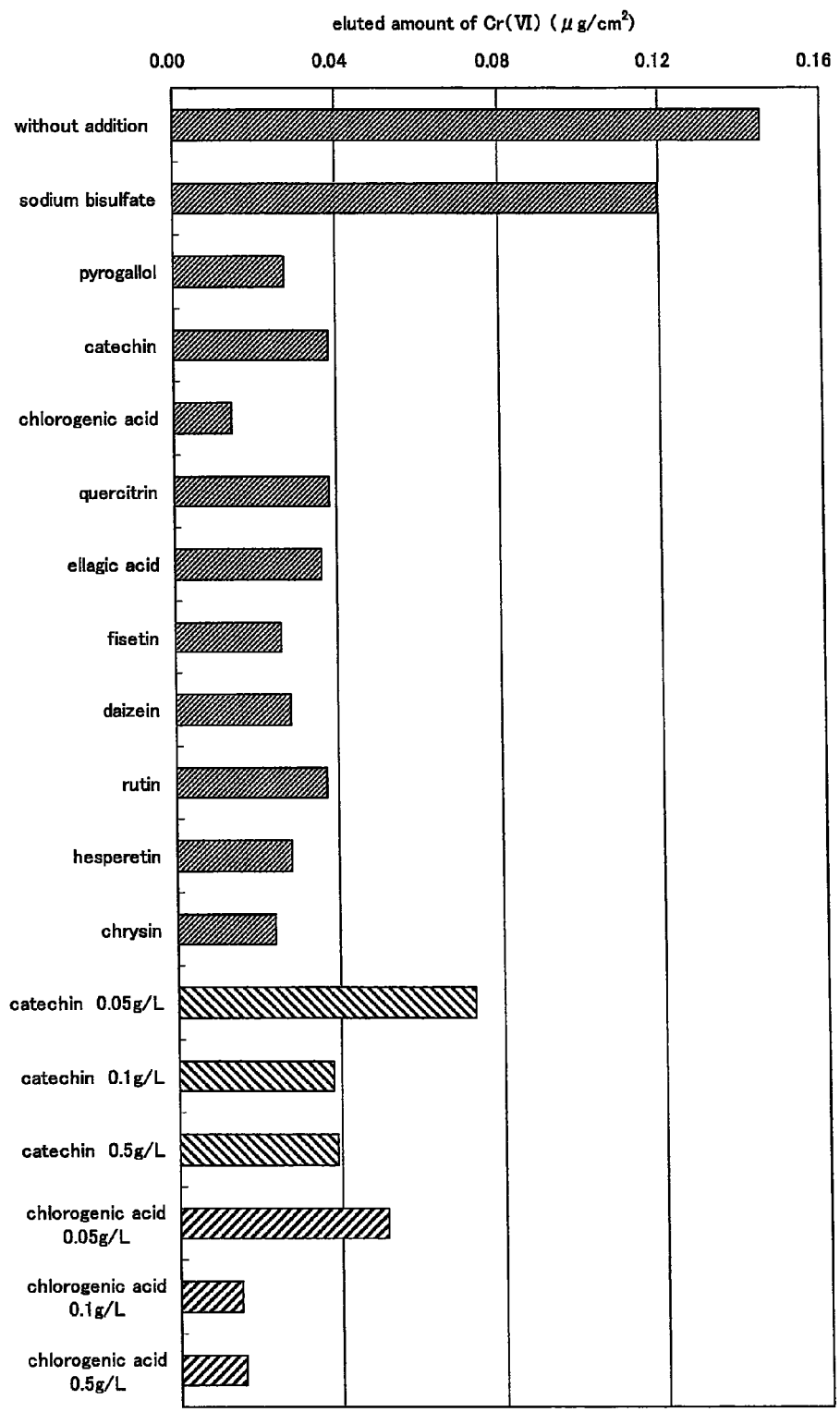
FIG. 3 is a bar graph of the results of measuring the amounts of elution after 120 hours.

The amount of elution of hexavalent chromium for each test plate which was stored for 120 hours is shown by the bar graph in FIG. 3. The amount of elution after 120 hours of the chemical conversion coating treated with a chemical conversion treatment solution containing at least 0.1 g/L of a polyphenol was markedly decreased.

TABLE 3

| test number | elution inhibitor | content in the chemical conversion treatment solution | hexavalent chromium content, μg/cm² | | | | |
|---|---|---|---|---|---|---|---|
| | | | 0 hr | 72 hr | 120 hr | 144 hr | 216 hr |
| 4-1 | without addition | — | 0.026 | 0.121 | 0.145 | — | * 0.154 |
| 4-2 | sodium bisulfate | 0.2 g/L | 0.005 | 0.091 | 0.120 | — | * 0.123 |
| 4-3 | pyrogallol | 0.1 g/L | 0.005 | 0.019 | 0.027 | 0.031 | 0.046 |
| 4-4 | catechin | 0.1 g/L | 0.017 | 0.029 | 0.038 | 0.044 | 0.055 |
| 4-5 | chlorogenic acid | 0.1 g/L | 0.003 | 0.008 | 0.014 | 0.017 | 0.023 |

TABLE 3-continued

| test number | elution inhibitor | content in the chemical conversion treatment solution | hexavalent chromium content, μg/cm² | | | | |
|---|---|---|---|---|---|---|---|
| | | | 0 hr | 72 hr | 120 hr | 144 hr | 216 hr |
| 4-6 | quercetin | 0.1 g/L | 0.010 | 0.029 | 0.038 | 0.042 | 0.040 |
| 4-7 | ellagic acid | 0.1 g/L | 0.004 | 0.024 | 0.036 | 0.041 | 0.043 |
| 4-8 | fisetin | 0.1 g/L | 0.014 | 0.023 | 0.026 | 0.028 | 0.039 |
| 4-9 | daizein | 0.1 g/L | 0.007 | 0.025 | 0.028 | 0.031 | 0.034 |
| 4-10 | rutin | 0.1 g/L | 0.013 | 0.029 | 0.037 | 0.044 | 0.048 |
| 4-11 | hesperetin | 0.1 g/L | 0.004 | 0.025 | 0.028 | 0.031 | 0.032 |
| 4-12 | chrysin | 0.1 g/L | 0.008 | 0.021 | 0.024 | 0.027 | 0.042 |
| 4-13 | catechin | 0.05 g/L | 0.039 | 0.060 | 0.073 | 0.078 | 0.099 |
| 4-14 | catechin | 0.1 g/L | 0.017 | 0.028 | 0.038 | 0.044 | 0.057 |
| 4-15 | catechin | 0.5 g/L | 0.009 | 0.029 | 0.039 | 0.044 | 0.053 |
| 4-16 | chlorogenic acid | 0.05 g/L | 0.030 | 0.046 | 0.051 | 0.055 | 0.064 |
| 4-17 | chlorogenic acid | 0.1 g/L | 0.003 | 0.008 | 0.015 | 0.017 | 0.023 |
| 4-18 | chlorogenic acid | 0.5 g/L | 0.001 | 0.007 | 0.016 | 0.021 | 0.029 |

* indicates resuls after storage for 240 hours.

EXAMPLE 5

Processes which were the same as the alkali degreasing process to the washing process after the chemical conversion treatment described in Example 1 were performed on steel plates having the same shape as the steel plate described in Example 1. The chemical conversion treatment solution of test number 1-7 was used in the chemical conversion treatment.

Each of the test plates after the washing process was immersed for 5 seconds in a post-treatment solution (solvent: ion-exchanged water) which contained a polyphenol having the content indicated in TABLE 4 and having its temperature at 25 degrees C. The test plate after immersion was washed and dried to obtain a test plate having a chemical conversion coating on which the post-coating treatment was performed. No by-products were found in any of the post-treatment solutions after the immersion.

The resulting test plates were stored in a constant-temperature and constant-humidity oven, the atmosphere in which was kept at a temperature of 80 degrees C. and a relative humidity of 100% for 120 hours. The test plates after storage were evaluated from the viewpoint of the hexavalent chromium content in the chemical conversion coating. The method of measuring the content of hexavalent chromium was similar to the method described in Example 1.

As shown in TABLE 4, when a chemical conversion coating formed by a conventional chemical conversion treatment solution was contacted with a post-treatment solution containing 0.1 g/L of a polyphenol, the amount of elution of hexavalent chromium decreased by 0.015 μg/cm² or less.

TABLE 4

| test No. | elution inhibitor | content in the post-treatment solution | hexavalent chromium content, μg/cm² | |
|---|---|---|---|---|
| | | | 0 hr | 120 hr |
| 5-1 | without addition | — | 0.036 | 0.090 |
| 5-3 | pyrogallol | 0.1 g/L | 0.000 | 0.003 |
| 5-5 | chlorogenic acid | 0.1 g/L | 0.000 | 0.006 |
| 5-6 | quercetin | 0.1 g/L | 0.000 | 0.005 |
| 5-7 | ellagic acid | 0.1 g/L | 0.000 | 0.008 |
| 5-8 | fisetin | 0.1 g/L | 0.000 | 0.012 |
| 5-9 | daizein | 0.1 g/L | 0.000 | 0.004 |
| 5-10 | rutin | 0.1 g/L | 0.000 | 0.005 |
| 5-11 | hesperetin | 0.1 g/L | 0.000 | 0.000 |
| 5-12 | chrysin | 0.1 g/L | 0.000 | 0.008 |

The invention claimed is:

1. A composition for chemical conversion treatment comprising at least 0.1 g/L of a polyphenol and at least 1.5 g/L in chromium ion equivalent of an aqueous trivalent chromium compound, and having a pH of 6 or less, wherein a chemical conversion coating formed on a metallic surface of a member by contacting the metallic surface with the composition for chemical conversion treatment has a content of hexavalent chromium of 0.04 μg/cm² or less as measured by a method compliant with EN15205 after exposure to an environment having a temperature of 80 degrees C. and a relative humidity of 100% for 120 hours, wherein the polyphenol comprises at least one of the compounds selected from the group consisting of pyrogallol, 5-methylpyrogallol, 5-propylpyrogallol, pyrogallol-1,3-dimethylether, pyrogallol-1,3-diethylether, and 5-propylpyrogallol-1-methylether.

2. A dense composition for the preparation of the composition of claim 1 comprising at least 0.5 g/L of a polyphenol and at least 7.5 g/L in chromium ion equivalent of an aqueous trivalent chromium compound.

3. An additive for a composition for chemical conversion treatment comprising at least 1.5 g/L in chromium ion equivalent of an aqueous trivalent chromium compound and having a pH of 6 or less, the additive containing a polyphenol, wherein the content of the polyphenol in the composition for chemical conversion treatment after the addition is at least 0.1 g/L and a chemical conversion coating formed on a metallic surface of a member by contacting the metallic surface with the composition for chemical conversion treatment has a content of hexavalent chromium of 0.04 μg/cm² or less as measured by a method compliant with EN15205 after exposure to an environment having a temperature of 80 degrees C. and a relative humidity of 100% for 120 hours, wherein the polyphenol comprises at least one of the compounds selected from the group consisting of pyrogallol, 5-methylpyrogallol, 5-propylpyrogallol, pyrogallol-1,3-dimethylether, pyrogallol-1,3-diethylether, and 5-propylpyrogallol-1-methylether.

* * * * *